J. HARSEN.
TROLLEY POLE.
APPLICATION FILED AUG. 25, 1908.

937,935.

Patented Oct. 26, 1909.

Witnesses:
C. A. Jarvis
C. T. Neal

Inventor
Jacob Harsen.
By Emerich R. Newell
his Attorney.

UNITED STATES PATENT OFFICE.

JACOB HARSEN, OF NEW YORK, N. Y.

TROLLEY-POLE.

937,935.

Specification of Letters Patent.  Patented Oct. 26, 1909.

Application filed August 25, 1908. Serial No. 450,206.

*To all whom it may concern:*

Be it known that I, JACOB HARSEN, a citizen of the United States, residing at New York city, New York, have invented certain new and useful Improvements in Trolley-Poles, of which the following is a clear, full, and exact description.

My invention relates to an improvement in trolley poles for trolley cars and my object is to provide for a construction that will readily adjust itself to any direction in which the car may be moving, such as taking switches and rounding curves, and enable the trolley wheel carried thereby to easily follow the trolley wire. This I accomplish by dividing the trolley pole into separate sections and pivoting them together so that the portion which carries the trolley wheel may turn transversely to the line of travel of said wheel. This will enable the trolley wheel to keep to the wire although the main portion of the pole and car may not be directly beneath the same.

It is well known that with the ordinary rigid trolley pole, there is considerable side strain on the trolley wheel and a tendency for it to leave the wire when a car is rounding a curve owing to the fact that the car is not directly beneath the wire and therefore twists the trolley pole to one side. This fault in the ordinary trolley pole is remedied by my construction.

My invention will be defined in the claims.

Figure 1:
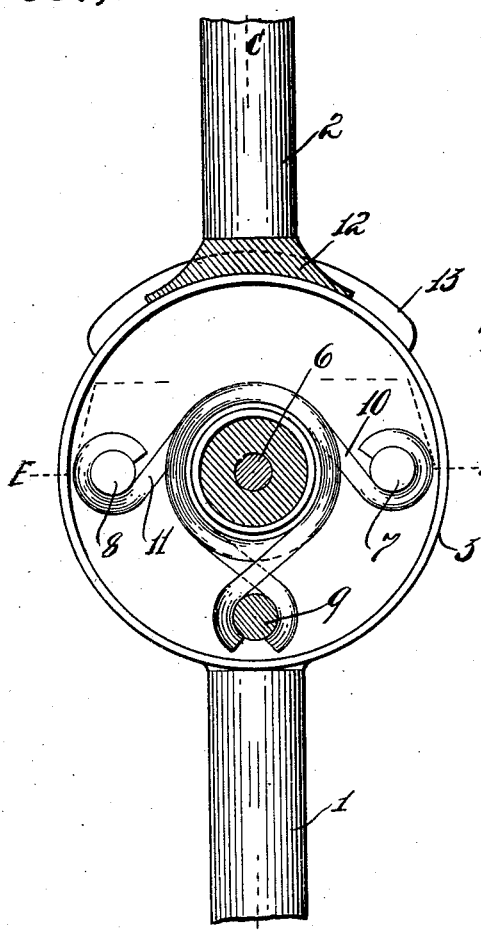
Figure 2:
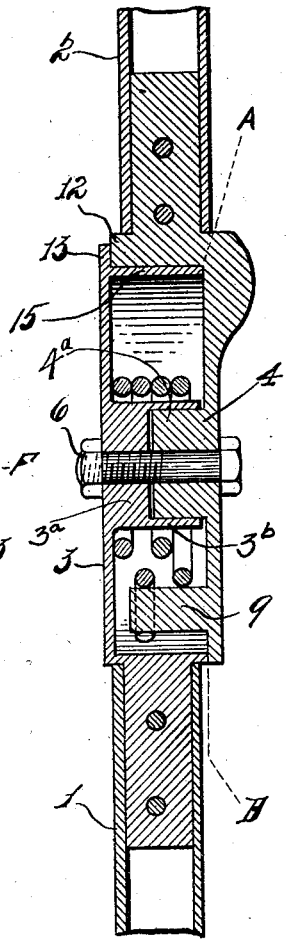
Figure 3:
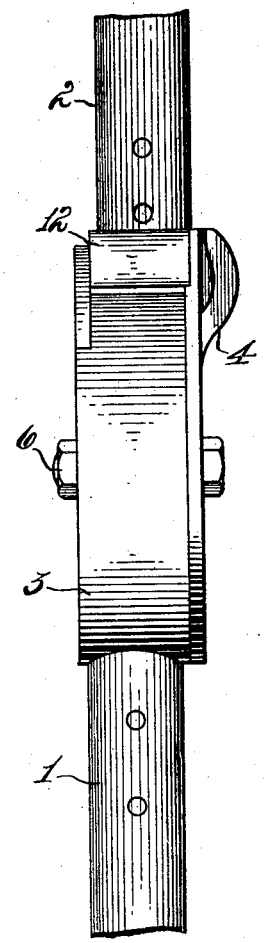
Figure 4:
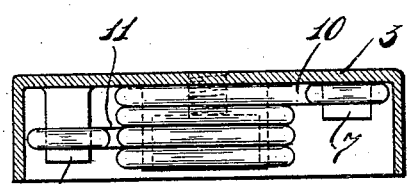
Figure 5:
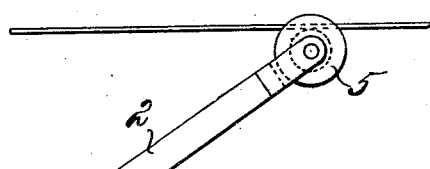

The drawings show a preferred embodiment of my invention in which,

Figure 1 is a plan view of my construction with the disk portion of the wheel carrying member removed through section line A—B of Fig. 2. Fig. 2 is a longitudinal section through line C—D of Fig. 1. Fig. 3 is a side view of the complete device. Fig. 4 is a section taken through line E—F of Fig. 1. Fig. 5 is a view of the upper portion of the trolley pole showing a wheel in engagement with a trolley wire.

In the drawings 1 represents the main portion of the pole or base member.

2 represents the upper portion of the pole or wheel carrying member carrying the wheel 5 as shown in Fig. 5.

The main portion 1 of the pole is preferably provided at its upper end with a cup-shaped portion 3 as shown more particularly in Figs. 2 and 4. The wheel carrying member 2 of the pole is preferably provided with a disk-shaped portion 4 which fits over the cup-shaped portion of the main pole member and serves as a cover disk to form a hollow chamber. It is obvious that the cup-shaped portion and the disk portion which form this hollow chamber may be constructed respectively on either the main portion 1 of the trolley pole or upon the wheel carrying member and the construction here shown is merely a preferable form of arranging these portions to form a hollow casing.

Projecting from the central portion of the disk member 4 is a circular boss $4^a$, and also opposite the same is a projecting boss $3^a$ from the central part of the cup-shaped member 3, the latter boss having a flange $3^b$ extending therefrom and encircling the first-named boss $4^a$ to form a bearing therefor. A pivot stud 6 passing through said bosses $3^a$ and $4^b$ pivotally connects the two members together. Encircling this stud, as shown in Figs. 1, 2 and 4, are two torsional springs 10 and 11. These springs are so coiled about the pivot stud as to act in opposite directions, the spring 10 having one end connected to the boss 7 of the cup-shaped portion 3 and the spring 11 having one end connected to the boss 8 at the opposite side of the pivot stud of this same portion 3 and both springs bearing on opposite sides of the boss 9 of the disk-shaped portion. Thus, it is seen that these two springs form oppositely acting tension means normally maintaining the two sections 1 and 2 of the pole alinement. It may not be necessary in all cases to mount these oppositely acting torsional springs such as I have represented in the present case for it is obvious that equivalent means may be used to connect them to separate parts of the trolley pole in order to form oppositely acting tension means. However, these springs in all cases should be so arranged so as to allow the upper portion 2 of the pole to swing on its pivot in either direction as the case may require when the car is rounding a curve and to bring the same back in alined position to the main portion of the pole as soon as the car is again on a straight track. In order to firmly connect the wheel carrying member 2 to its disk portion 4, I have preferably shown a reinforced portion 12 which laps over and partially surrounds the upper side wall 15 of the cup-shaped portion 3. A rim 13 preferably projects from the upper part of the cup-shaped portion to serve as a guide for the part 12.

What I claim is:—

1. A trolley pole comprising a base member and a wheel member normally in alinement therewith, said members being pivotally connected by a stud to permit a lateral turning of said wheel member, one of said members having a cup-shaped portion and the other member a coöperating cover disk for forming a casing around said stud, and yielding means wholly inclosed within said casing for normally maintaining said members in alinement.

2. A trolley pole comprising a base member and a wheel member normally in alinement therewith and adapted to be swung laterally therefrom, one of said members having a cup-shaped portion and the other a coöperating cover disk for forming a casing therewith, oppositely disposed bearing bosses projecting from the central portions of said cup and disk members, and a flange extending from one of said bosses and encircling the other to provide a bearing therefor, a pivot stud passing through said bosses for pivotally connecting said members, and yielding means wholly inclosed within said casing for normally maintaining said members in alinement.

3. A trolley pole comprising a base member and a wheel member normally in alinement therewith, said members being pivotally connected by a stud at right angles to the length of said trolley pole to permit a lateral turning of said wheel member, one of said members having a cup-shaped portion and the other member a coöperating cover disk for forming a casing around said stud, yielding means wholly inclosed within said casing for normally maintaining said members in alinement, comprising oppositely acting torsional springs coiled around said pivot stud and connected to each member of said trolley pole.

4. A trolley pole comprising a base member and a wheel member carrying a trolley wheel, one of said members having a cup-shaped portion and the other member a cover disk for forming a casing therewith, said members being pivotally connected by a stud through the center of said chamber and at right angles to the axis of rotation of said trolley wheel, said cup-shaped portion having a projecting boss at each side of its center and said cover disk having a similar boss at its lower central portion, a pair of oppositely acting torsional springs coiled around said pivot stud for keeping said members in alinement, both of said springs engaging with the lower central boss of the cover disk and one spring being connected to each of the side bosses of the cup-shaped portion.

Signed at city of New York, N. Y. this 21 day of August 1908.

JACOB HARSEN.

Witnesses:
 ROBERT ROSS,
 EDWARD J. O'NEILL.